United States Patent
Lehouillier et al.

(10) Patent No.: US 10,191,932 B2
(45) Date of Patent: Jan. 29, 2019

(54) DEPENDENCY-AWARE TRANSACTION BATCHING FOR DATA REPLICATION

(71) Applicant: Oracle International Corporation, Redwood Shores, CA (US)

(72) Inventors: Sean Lehouillier, San Mateo, CA (US); Hung V. Tran, Sunnyvale, CA (US); Vasanth Rajamani, San Carlos, CA (US); Nimar S. Arora, Union City, CA (US); Lik Wong, Palo Alto, CA (US)

(73) Assignee: Oracle International Corporation, Redwood Shores, CA (US)

( * ) Notice: Subject to any disclaimer, the term of this patent is extended or adjusted under 35 U.S.C. 154(b) by 94 days.

(21) Appl. No.: 14/222,373

(22) Filed: Mar. 21, 2014

(65) Prior Publication Data
US 2015/0269215 A1 Sep. 24, 2015

(51) Int. Cl.
*G06F 9/46* (2006.01)
*G06F 17/30* (2006.01)

(52) U.S. Cl.
CPC .... *G06F 17/30368* (2013.01); *G06F 17/3038* (2013.01); *G06F 17/3053* (2013.01); *G06F 17/30575* (2013.01); *G06F 17/30581* (2013.01); *G06F 17/30864* (2013.01)

(58) Field of Classification Search
USPC ....................................................... 707/703
See application file for complete search history.

(56) References Cited

U.S. PATENT DOCUMENTS

| | | | | |
|---|---|---|---|---|
| 6,199,171 B1* | 3/2001 | Bossen | ............... | G06F 11/1641 714/12 |
| 6,976,022 B2* | 12/2005 | Vemuri | ............. | G06F 17/30371 |
| 7,529,759 B2* | 5/2009 | Chen | .................. | G06F 17/3051 |
| 7,778,985 B2* | 8/2010 | Scholtz | .................. | G06F 9/485 707/703 |
| 8,341,134 B2* | 12/2012 | Bourbonnais | ..... | G06F 17/30578 707/703 |
| 8,473,953 B2* | 6/2013 | Bourbonnais | ....... | G06F 11/1474 707/703 |

(Continued)

OTHER PUBLICATIONS

U.S. Appl. No. 13/951,281, filed Jul. 25, 2013, Office Action, dated Jun. 2, 2015.

(Continued)

*Primary Examiner* — Kim T Nguyen
(74) *Attorney, Agent, or Firm* — Hickman Palermo Becker Bingham LLP

(57) ABSTRACT

Techniques are provided for dependency-aware transaction batching for data replication. A plurality of change records corresponding to a plurality of transactions is read. Inter-transaction dependency data is generated, the inter-transaction dependency data including at least one inter-transaction dependency relationship between a plurality of pending transactions. Each inter-transaction dependency relationship indicates that a first transaction is dependent on a second transaction. A batch transaction is generated based on the inter-transaction dependency data. The batch transaction includes at least one pending transaction of the plurality of pending transactions. The batch transaction is assigned to an apply process of a plurality of apply processes configured to apply batch transactions in parallel.

22 Claims, 10 Drawing Sheets

(56) References Cited

U.S. PATENT DOCUMENTS

| | | | |
|---|---|---|---|
| 8,671,085 B2* | 3/2014 | Dhamankar | G06F 11/1471 707/703 |
| 9,063,773 B2* | 6/2015 | Lu | G06F 9/466 |
| 2002/0133507 A1 | 9/2002 | Holenstein | |
| 2002/0198899 A1 | 12/2002 | Yamaguchi et al. | |
| 2004/0068501 A1 | 4/2004 | McGoveran | |
| 2005/0289198 A1 | 12/2005 | Stephen | |
| 2007/0288530 A1 | 12/2007 | Romem et al. | |
| 2008/0052322 A1 | 2/2008 | Gusciora | |
| 2009/0037461 A1* | 2/2009 | Rukonic | G06Q 40/02 |
| 2010/0250491 A1 | 9/2010 | Jin et al. | |
| 2011/0173619 A1 | 7/2011 | Fish | |
| 2012/0023369 A1 | 1/2012 | Bourbonnais et al. | |
| 2012/0278282 A1 | 11/2012 | Lu et al. | |
| 2013/0226870 A1 | 8/2013 | Dash | |
| 2015/0032695 A1 | 1/2015 | Tran et al. | |

OTHER PUBLICATIONS

U.S. Appl. No. 13/951,281, filed Jul. 25, 2013, Notice of Allowance, dated May 18, 2016.
U.S. Appl. No. 13/951,281, filed Jul. 25, 2013, Final Office Action, dated Jan. 6, 2016.

* cited by examiner

```
TRANSACTION A : [3] [5] [5] [3] [5] [5] [5] [5] [5]
TRANSACTION B : [1] [1] [1]
TRANSACTION C : [9] [4] [9] [4] [9] [4] [9] [4] [9] [4]
TRANSACTION D : [1] [5] [5] [5] [3] [1] [5] [5]
```
*FIG. 4A*
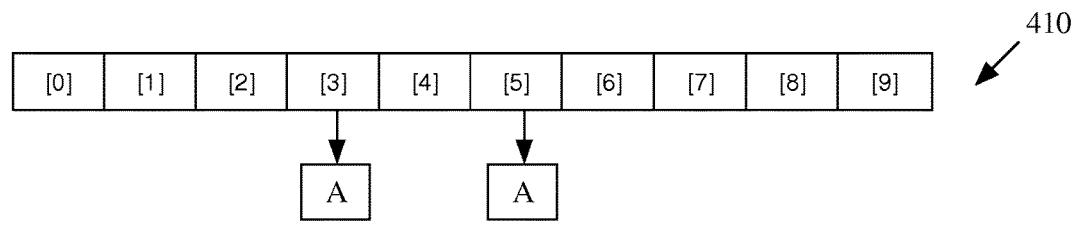
*FIG. 4B*
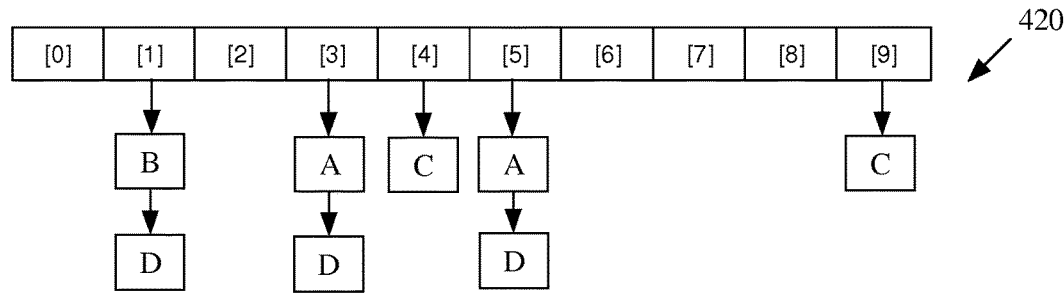
*FIG. 4C*
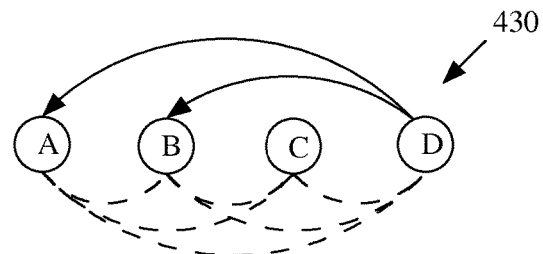
*FIG. 4D*

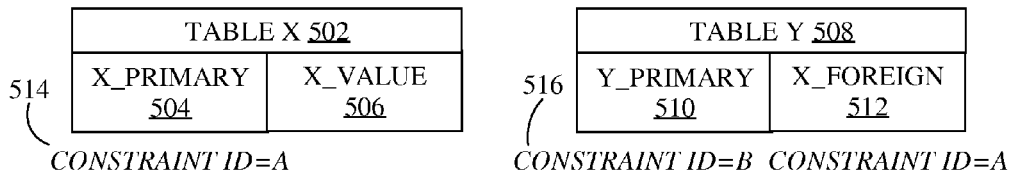

*FIG. 5A*

R1: INSERT TABLE_X (1,1)
R2: INSERT TABLE_X (2,1)
R3: INSERT TABLE_Y (1,1)
R4: INSERT TABLE_X (3,1)
R5: INSERT TABLE_Y (2,1)
R6: INSERT TABLE_X (4,1)
R7: UPDATE TABLE_X:
   X_VALUE=2 WHERE X_PRIMARY=1
R8: UPDATE TABLE_X:
   X_PRIMARY=10 WHERE X_PRIMARY=3
R9: INSERT TABLE_X (3,10)
R10: INSERT TABLE_X (5,1)
R11: INSERT TABLE_Y (3,1)
R12: INSERT TABLE_Y (4,3)

GROUP 1 [INSERT X]: R1, R2, R4, R6, R10
GROUP 2 [INSERT Y]: R3, R5, R11
GROUP 3 [UPDATE X: X_VALUE]: R7
GROUP 4 [UPDATE X: X_PRIMARY]: R8
GROUP 5 [INSERT X]: R9
GROUP 6 [INSERT Y]: R12

*FIG. 5D*

REORDERED BATCH TRANSACTION 526:
[R1, R2, R4, R6, R10], [R3, R5, R11], R7, R8, R9, R12

*FIG. 5E*

DEPENDENCY-AWARE TRANSACTION BATCHING FOR DATA REPLICATION

CROSS-REFERENCE TO RELATED APPLICATIONS

U.S. patent application Ser. No. 13/951,281, entitled "Client and Server Integration for Replicating Data," filed Jul. 25, 2013, is hereby incorporated by reference in its entirety for all purposes as if fully set forth herein.

TECHNICAL FIELD

The present disclosure generally relates to data management, and, more specifically, to data replication.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Computers systems may be configured to store and retrieve large amounts of data. Typically, computer systems rely on database systems to perform this function. Replication is the process of replicating data from a source database onto another database system, herein referred to as a target database.

One approach to replication is the physical replication approach. Under the physical replication approach, the changes made to data blocks on the source database are made to replicas of those data blocks on a target database. Another approach to replicating data is the logical replication approach. Under the logical replication approach, database commands that modify data on the source database are re-executed on the target database. While executing the same database commands guarantees that changes are replicated at the record level, the changes are not replicated at the data block level.

Typically, changes to database systems are made using transaction processing. A transaction is a set of operations that change data. In database systems, the operations are specified by one or more database commands. Committing a transaction refers to making the changes for a transaction permanent. Under transaction processing, all the changes for a transaction are made atomically. When a transaction is committed, either all changes are committed, or the transaction is rolled back.

Scalability describes the ability of a replication system to handle increasing amounts of data. One procedure to increase scalability involves a replication client applying individual transactions to the target database in parallel ("single transaction parallelism"). Single transaction parallelism involves considerable overhead, such as round-trip client-server communication and statement parsing. Furthermore, when the data includes many dependencies between transactions, the parallelism is reduced since a transaction cannot be executed until after all transactions on which the transaction is dependent are committed.

Another procedure to increase scalability involves grouping adjacent transactions into batch transactions and applying the batch transactions in parallel ("adjacent batch parallelism"). Adjacent batch parallelism helps reduce overhead by batching multiple changes in one statement. However, adjacent batch parallelism increases dependencies such that parallelism is further reduced.

Another procedure to increase scalability involves splitting transactions using some partitioning criteria ("partitioned parallel batching"). Individual transactions are partitioned using techniques such as vertical partitioning (e.g. based on table names) and/or horizontal partitioning (e.g. based on row ranges within a table). Similar partitions of different transactions are grouped into batch transactions, and the batch transactions are applied in parallel. In partitioned parallel batching, the partitioning scheme must be manually specified, and must be manually updated to accommodate for schema changes and/or workload changes. Additionally, partitioned parallel batching requires an implicit assumption that the batches don't conflict with each other. Furthermore, since transactions are split, partitioned parallel batching compromises the underlying atomicity of transactions.

Based on the foregoing, it is desirable to develop an approach that allows dependency-aware transaction batching for data replication.

BRIEF DESCRIPTION OF THE DRAWINGS

In the drawings:

FIGS. 4A-D illustrate embodiments of a dependency graph and the generation thereof;

FIGS. 5A-E illustrate embodiments of a batch transaction and the generation thereof;

DESCRIPTION OF EXAMPLE EMBODIMENTS

Figure 1A:
FIGS. 1A-B are block diagrams depicting an embodiment of a system for client and server integration for replicating data between a target database and a source database.

Dependency-aware transaction batching for data replication is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

General Overview

Dependency-aware transaction batching for data replication is described. A replication client is configured to replicate source database transactions on a target database in parallel. The replication client processes pending transactions to generate a dependency graph. The dependency graph includes inter-transaction dependency relationships between the pending transactions. As used herein, the term "inter-transaction dependency" refers to a dependency of a transaction on one or more other transactions. The dependency graph is used to generate batch transactions. Each batch transaction includes one or more of the pending transactions. The batch transactions are applied to the target database in parallel by multiple apply processes.

The dependency graph is used to group transactions such that dependent transactions are grouped together and applied by the same apply process. In one embodiment, the transactions in a batch transaction are not dependent on any external transaction other than transactions that have already been committed. This allows an apply process to execute the batch transaction without waiting or otherwise relying on communication with another process. In one embodiment, dependency-aware transaction batching generates batch transactions without external dependencies on non-committed transactions, allowing for a high degree of parallelism.

In one embodiment, generating a batch transaction is further based on transaction similarity. A similarity score may be used to assess the efficiency of executing two or more transactions together. For example, the similarity score may be based on the number of shared operation types between two transactions. As used herein, the term "operation type" refers to a specific database operation to be performed on a specific set of one or more columns of a specific database table. When transactions share a common operation type, it is possible to use an array operation to apply operations of the common operation type together. As used herein, the term "array operation" refers to an operation command that causes the database server to execute two or more operations of the same type.

Within a batch transaction, the operations in a batch transaction may be reordered to take advantage of array operations without violating any intra-batch dependency. As used herein, the term "intra-batch dependency" refers to a dependency of any operation in a batch transaction on one or more other operations in the batch transaction. If a transaction that is dependent on a second transaction is grouped with the second transaction in a batch transaction assigned to an apply process, the apply process can resolve the inter-transaction dependency by treating it as an intra-batch dependency.

Replication

Figure 1B:

FIGS. 1A-B are block diagrams depicting an embodiment of a system for client and server integration for replicating data between a target database and a source database. FIG. 1A is a block diagram depicting an embodiment of a system configured to generate replication data. Source database server 102 is configured to maintain a source database. In one embodiment, source database server 102 is configured to log database changes made to the source database.

Extraction client 104 is configured to extract replication data 106. Replication data 106 contains sufficient information to determine actions performed on the source database, including the data record(s) affected by an operation and the order in which the source transactions were committed. In one embodiment, extraction client 104 processes logged database changes made to the source database to extract logical replication data 106. In one embodiment, extraction client 104 does not have direct access to the source database. Alternatively, extraction client 104 may be a module of source database server 102 and/or may share one or more computing resources with source database server 102.

Replication data 106 contains change records that describe operations and/or transactions performed on the source database by source database server 102. A change record may include data showing the difference between an existing record and the new record. For example, the change records may be logical change records (LCRs) that contain information about changes to a database. In one embodiment, the LCRs are flattened or otherwise formatted to facilitate storage and/or transmission.

In one embodiment, replication data 106 includes all change records for transactions performed on the source database in committed order. Replication data 106 may alternatively include a subset of transactions performed on the source database. Extraction client 104 may be configured to capture operations and/or transactions performed on the source database. For example, extraction client 104 may generate a log, structure, and/or file containing database operations. Replication data may include one or more files or other data, which may be generated specifically for the purpose of replication, or alternatively generated as an audit or record file. In one embodiment, replication data 106 resides on source database server 102 outside of the source database. Alternatively and/or in addition, extraction client 104 may transmit replication data 106 over a network. For example, extraction client 104 may write replication data 106 to a network location. Alternatively and/or in addition, extraction client 104 may generate a replication data stream containing replication data 106. For example, extraction client 104 may extract replication data for an online target database server.

FIG. 1B is a block diagram depicting an embodiment of a system for performing replication on a target database. Target database server 110 is configured to maintain a target database. Replication client 108 and target database server 110 are integrated to facilitate replication on the target database. Replication client 108 does not have direct access to the target database. However, replication client 108 may be a module of target database server 110 and/or may share one or more computing resources with target database server 110.

Replication client 108 is configured to read change records contained in replication data 106 and apply the corresponding changes to the target database via target database server 110. The change records may be read from a file containing database operations, a network location, or over a data stream. In one embodiment, the change records include all transactions performed on the source database in committed order. For example replication client 108 may read replication data 106 from a network location. Alternatively and/or in addition, replication client 108 may receive change records from a replication data stream containing replication data 106. In one embodiment, replication client 108 does not create an intermediate object or otherwise format the change record before transmitting the change record to the target database server 110. For example, replication client 108 may receive replication data 106 directly from extraction client 104.

Replication client 108 may communicate with target database server 110 via a public interface of target database server 110, such as an SQL interface. Alternatively and/or in addition, replication client 108 may be integrated with target database server 110 to bypass the public interface.

Parallel Replication System

Figure 2:
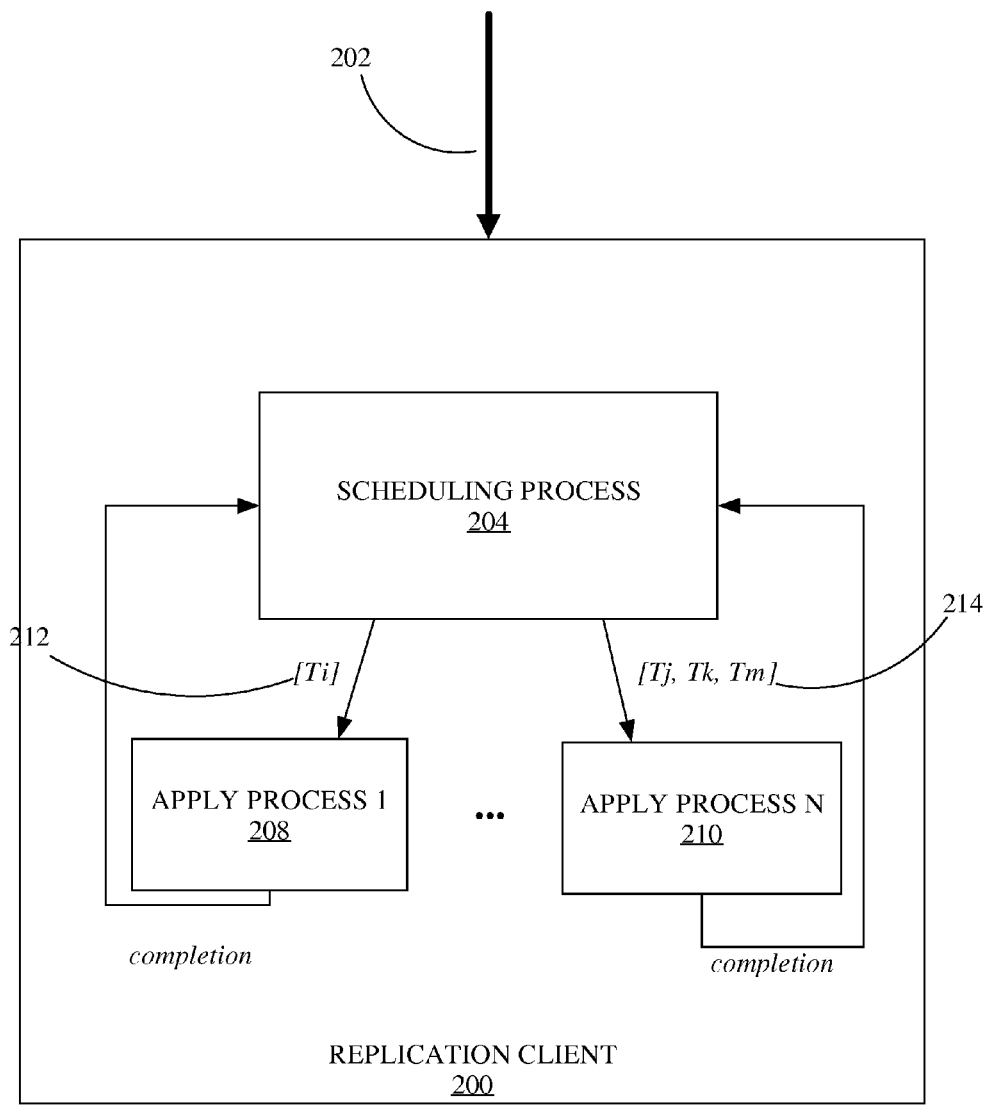
FIG. 2 is a block diagram depicting an embodiment of a replication client configured to generate and apply batch transactions in parallel.

FIG. 2 is a block diagram depicting an embodiment of a replication client configured to generate and apply batch transactions in parallel. Replication client 200 is configured to replicate source database transactions on a target database.

Replication client 200 is configured to read replication data 106. Replication data 106 includes a plurality of change records for a plurality of transactions performed on a source database. Replication data 106 may be stored replication data, such as a log file, a remote file accessed over a network location, and/or other stored replication data. Replication data 106 may also be received by replication client 200 as a data stream associated with a source database server. In one embodiment, replication data 106 includes all transactions performed on the source database in committed order, and each transaction terminates with a commit change record to reflect the committing of the transaction in the source database.

Replication client 200 processes replication data 106 to identify inter-transaction dependencies and generate inter-transaction dependency data, such as a dependency graph. The inter-transaction dependency data, or dependency graph, is used to generate batch transactions that include one or more individual transactions. Inter-transaction dependency data and dependency graphs are described in greater detail below.

Any procedure for identifying dependencies may be used. There is often a tradeoff between accuracy and resource consumption in procedures for identifying dependencies. In one embodiment, replication client 200 computes inter-transaction dependencies by computing hash values based on the change records of replication data 106. The hash values may be used to facilitate downstream operations, such as identifying intra-batch dependencies for reordering operations in a batch transaction. Examples of dependency calculation are described in greater detail below with respect to generating a dependency graph (FIGS. 4A-D) and reordering a batch transaction (FIGS. 5A-E).

Replication client 200 further includes scheduling process 204. Scheduling process 204 is configured to generate one or more batch transactions. Batch transactions are generated based on the dependency graph. When a dependent transaction and the transaction on which it is dependent are grouped in the same batch transaction, the dependency between the batched transactions is resolved as one or more intra-batch dependencies. Intra-batch dependencies are handled by the apply process 208-210 to which a particular batch transaction is assigned. An intra-batch dependency can be handled without waiting for or otherwise relying on another apply process 208-210.

In one embodiment, scheduling process 204 is configured to generate at least one batch transaction 212-214 comprising change records for at least one pending transaction. Batch transaction 212 includes a single transaction: Ti. Batch transaction 214 includes multiple transactions: Tj, Tk and Tm. For small transactions, batching can help improve performance by minimizing round-trip communications, dependency operations and other updates involved with committing the individual transactions. Batching may also increase the efficiency of transaction reordering by enabling execution of array operations across multiple transactions, which shall be described in greater detail below. Array operations are typically faster than individual executions and reduce overhead, such as redo or other logging data that is generated.

Scheduling process 204 is further configured to assign batch transactions 212-214 to one or more apply processes 208-210. When an apply process 208-210 is assigned a batch transaction 212-214, the apply process executes the batch transaction. Apply processes 208-210 may reorder one or more change records in the batch to generate and execute a reordered batch transaction. In one embodiment, dependency data generated to compute inter-transaction dependencies is preserved for use by apply processes 208-210 to determine intra-batch dependencies. For example, apply processes 208-210 may use intra-batch dependencies to reorder a batch transaction.

When apply processes 208-210 have finished processing an assigned batch transaction 212-214, apply processes 208-210 notify scheduling process 204 that processing is complete, and/or that the apply process 208-210 is free to execute a new batch transaction. In one embodiment, the individual transactions of a batch transaction 212-214 are committed after execution of the batch transaction 212-214 by an apply process 208-210. In this case, the effect of the individual transactions will not be visible to other apply processes 208-210 until execution of the entire batch transaction 212-214 is complete. After execution of the batch transaction 212-214, the inter-transaction dependency data may be updated to reflect that the individual transactions are committed.

Dependency Graph

Inter-transaction dependency data is used to perform dependency-aware transaction batching. In one embodiment, the inter-transaction dependency data comprises a dependency graph. A dependency graph includes at least one inter-transaction dependency relationship between a plurality of pending transactions. Each inter-transaction dependency relationship indicates that a first transaction is dependent on a second transaction. As used herein, the term "dependency graph" refers to any set of data that identifies at least one inter-transaction dependency relationship. Although edges and nodes are illustrated with respect to one or more dependency graph embodiments to illustrate the systems and methods described, the storage of any inter-transaction dependency data between pending transactions in any other form is within the scope of this disclosure.

Figure 3A:
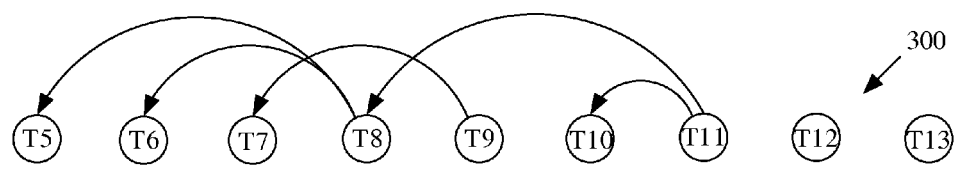
FIGS. 3A-F illustrate embodiments of dependency graphs.

In one embodiment, the dependency graph includes one or more nodes, each node representing a pending transaction. An inter-transaction dependency relationship indicating that a first transaction is dependent on a second transaction is represented as a directed edge from a first node to a second node, where the first node represents the first transaction and the second node represents the second transaction. FIG. 3A illustrates an embodiment of a dependency graph. Dependency graph 300 includes inter-transaction dependency relationships between pending transactions T5-T13.

When a first transaction is directly dependent on a second transaction, one or more operations of the first transaction is dependent on one or more operations of the second transaction. Transaction T11 is directly dependent on transaction T8 and transaction T10. Transaction T9 is directly dependent on transaction T7. Transaction T8 is directly dependent on transaction T5 and transaction T6.

A transaction may also be indirectly dependent on another transaction. In this case, an operation of the first transaction is not dependent on a specific operation of the second transaction. However, the first transaction may be directly dependent on another transaction that is directly dependent on the second transaction. In the example shown in FIG. 3A, transaction T11 is indirectly dependent on transaction T5 and transaction T6.

Figure 3B:
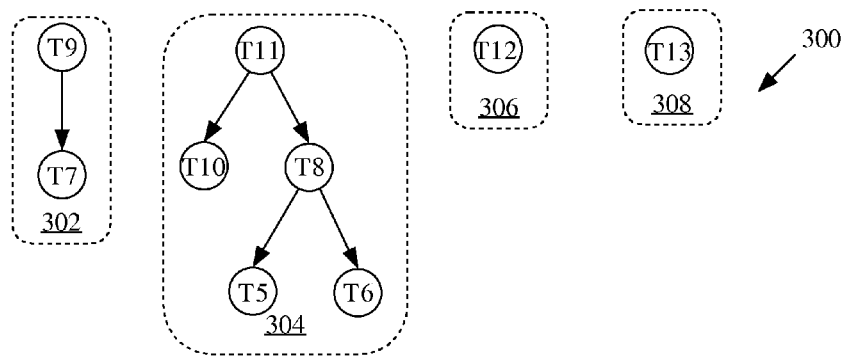

FIG. 3B illustrates an alternative view of dependency graph 300. Dependency graph 300 is rearranged to show subgraphs of pending transactions that are not dependent on any external pending transaction. Subgraph 302 includes pending transactions T9 and T7. Subgraph 304 includes transactions T11, T10, T8, T5 and T6. Subgraph 306 includes transaction T12. Subgraph 308 includes transaction T13. Each of subgraphs 302-308 contain pending transactions that may be applied without waiting for an external pending transaction to be committed first.

Similarity Data

In one embodiment, similarity data is also used to perform dependency-aware transaction batching. A similarity score may be generated for two or more transactions. A similarity score between two or more transactions may be based on operation types shared by the change records of the two or more transactions. When transactions in a batch transaction include change records that share a common operation type, array operations are likely to make execution of a batch transaction more efficient.

In one embodiment, a cost function is used to determine the similarity score. The cost function may be used to compare the estimated cost of executing two or more transactions separately and the estimated cost of executing the transactions as a single batch transaction. The following cost function may be used to determine the estimated cost of executing a transaction T, where: operation_types(T) is the number of unique operation types in transaction T; change_records(T) is the number of change records in transaction T; and $K_1$ and $K_2$ are constants:

$Cost(T)=K_1*operations\_types(T)+K_2*change\_records(T)$.

In one embodiment, determining whether to combine transaction Ti and transaction Tj into a batch transaction is based on two estimated costs:

[1] the estimated cost of executing transaction Ti and transaction Tj as separate transactions: Cost(Ti)+Cost(Tj); and

[2] the estimated cost of executing transaction Ti and transaction Tj together:

Cost(Ti+Tj).

The cost of an individual transaction may be stored for later use. Although a pairwise comparison of two transactions Ti+Tj is described, the cost function Cost(ΣT) may be generalized to compute an estimated cost for executing any number of transactions.

In one embodiment, a similarity score is calculated by dividing the cost savings of performing a batch transaction ([1]-[2]) by the cost of performing the transactions separately ([1]):

Similarity (Ti,Tj)=(Cost(Ti)+Cost(Tj)−Cost(Ti+Tj))÷(Cost(Ti)+Cost(Tj)).

Figure 3C:
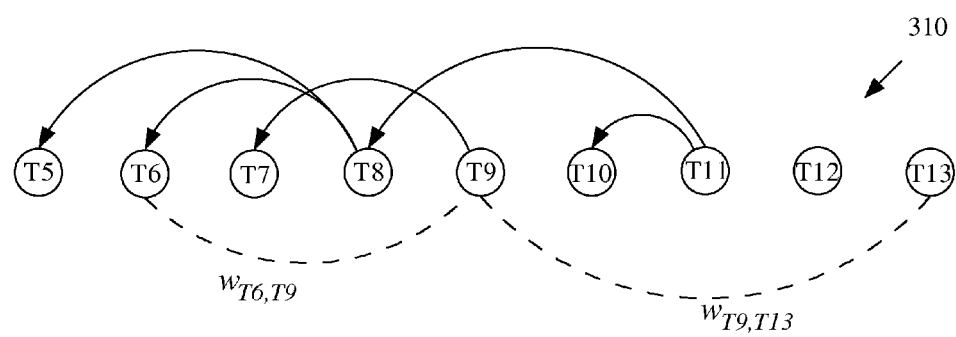

In one embodiment, similarity data is generated for pending transactions. For example, similarity data may be represented as undirected edges between nodes that represent pending transactions. FIG. 3C illustrates an embodiment of similarity data. Graph 310 includes both inter-transaction dependency relationships and similarity data. The inter-transaction dependency relationships are shown as directed edges from the dependent transaction, while the similarity data is shown as undirected edges between transaction pairs.

The similarity data may be weighted or unweighted. When the similarity data is weighted, the weight may be based on a similarity score calculated based on one or more cost functions. Similarity weight $W_{T6,T9}$ is based on a similarity score calculated for transaction T6 and transaction T9. Similarity weight $W_{T9,T13}$ is based on a similarity score calculated for transaction T9 and transaction T13.

Although Similarity data is shown for two pairs of transactions, similarity data may be calculated for every pair of pending transactions. For example, when a new pending transaction is added to the dependency graph, a similarity score may be calculated between the new pending transaction and the existing pending transactions. Alternatively, the similarity score may be generated when determining one or more transactions to include in a batch transaction.

When the similarity data is not weighted, a similarity score may be used to determine whether two transactions should be linked. For example, the similarity data may include an undirected, unweighted edge when a similarity score between a pair of pending transactions exceeds a threshold.

Currently Executing Transactions

As described above, the inter-transaction dependency data (e.g. dependency graph) includes inter-transaction dependency relationships for pending transactions. The pending transactions may also be dependent on currently executing transactions and/or completed transactions. When deciding whether a pending transaction may be scheduled, a dependency on a completed transaction does not need to be considered, since completed transactions are already committed in the target database. However, dependencies on currently executing transactions must be considered.

In order to generate a batch transaction that can be executed without waiting for transactions outside of the batch transaction, transactions in the batch transaction cannot depend, directly or indirectly, on any currently executing transaction, because a currently executing transaction cannot be added to the batched transaction—it is already assigned to another apply process, and is therefore no longer pending.

A pending transaction that is dependent on a currently executing transaction should not be scheduled until the currently executing transaction is complete. In one embodiment, a transaction is considered currently executing beginning at the time that a scheduling process assigns the transaction to an apply process and ending at the time that the apply process notifies the scheduling process that the transaction is complete. Alternatively, a transaction may be considered a currently executing transaction beginning at some point after the transaction is assigned to an apply process, either alone or in a batch transaction, and/or ending at some point before the apply process notifies the batch scheduling process that the transaction is complete.

Figure 3D:
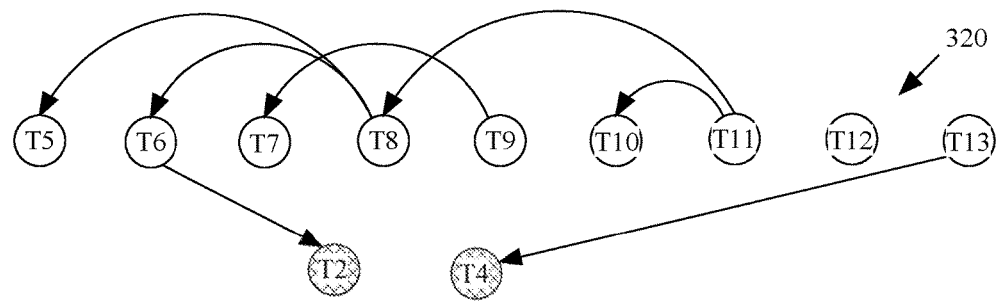

The dependency graph includes information regarding dependencies on currently executing transactions. For example, the dependency graph may directly include directed edges that specify the dependency relationship between pending transactions and currently executing transactions. FIG. 3D illustrates an embodiment of a dependency graph. Dependency graph 320 includes pending transactions T5-T13 and currently executing transactions T2 and T4. Pending transaction T6 is directly dependent on currently executing transaction T2, and pending transaction T13 is directly dependent on currently executing transaction T4. The dependency graph includes the dependency relationship, as shown by the directed edges from T13 to T4 and from T6 to T2. Currently executing transactions T2 and T4 are marked to indicate their currently executing status.

Figure 3E:
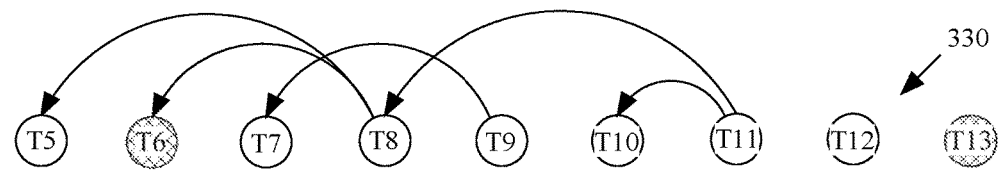

In one embodiment, the dependency graph includes information to mark pending transactions that are directly dependent on currently executing transactions. FIG. 3E illustrates an embodiment of a dependency graph. Dependency graph 330 includes the same pending transactions and dependencies shown in dependency graph 320. Although currently executing transactions T2 and T4 are not included in dependency graph 330, transactions T6 and T13 are marked to indicate that they are directly dependent on one or more currently executing transactions.

In one embodiment, the dependency graph includes information to mark pending transactions that are directly or indirectly dependent on currently executing transactions.

Figure 3F:
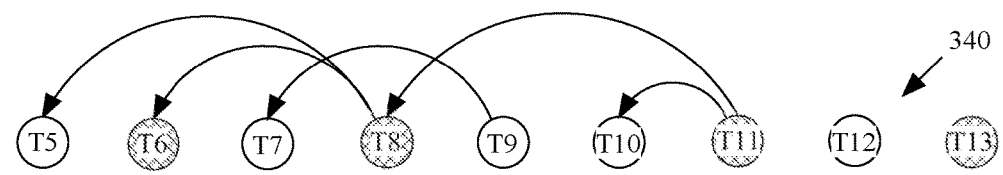

FIG. 3F illustrates an embodiment of a dependency graph. Dependency graph 340 includes the same pending transactions and dependencies shown in dependency graph 320 and dependency graph 330. Although currently executing transactions T2 and T4 are not included in dependency graph 340, transactions T6, T8, T11 and T13 are marked to indicate that they are directly or indirectly dependent on one or more currently executing transactions.

In one embodiment, graph coloring techniques are used to track pending transactions that are directly and/or indirectly dependent on currently executing transactions. Such transactions should not be added to a batch transaction because they must wait for the currently executing transaction to complete before being applied. For example, by coloring all nodes in the data dependency graph that correspond to a transaction that depends, directly and/or indirectly, on a currently executing transaction, a transaction corresponding to a colored node can be immediately excluded from consideration as a candidate transaction to add to the batch transaction.

Detecting Dependencies Based on Hash Values

Dependencies may be detected in any manner. In one embodiment, a hash function is used to detect dependencies. The hash values are used to determine whether any operation in a first transaction depends on an operation in a second transaction, and thus whether the first transaction depends on the second transaction. The hash values may also be used to determine intra-transaction dependencies, which is described in greater detail below.

Hash values are calculated based on a value for one or more columns affected by an operation, as well as and a constraint identifier ("CID") of the corresponding column/s. In other words, the hash function FN(value, CID) is applied to one or more values and columns of each operation. When a column does not affect dependency calculations, a CID will not be assigned to the column. When two columns are related in a way that may involve dependencies, the columns are given the same constraint identifier.

For example, in FIG. 5A, TABLE X 502 includes columns 504-506, EMP_NO and ROOM_NO, where EMP_NO is a primary key of TABLE X. TABLE Y 508 includes columns 510-512, PARKING and EMP_NO, where PARKING is a primary key of TABLE Y, and EMP_NO is a foreign key that refers to TABLE X. Because each entry into TABLE Y potentially depends on an entry in TABLE X because of the foreign key column 512, column 512 and column 504 are assigned the same constraint identifier A. If we insert a row EMP_NO="1", ROOM_NO="105" to Table X, and later insert a row PARKING="34", EMP_NO="1" to Table Y, the second operation is dependent on the first operation. This would be detected because hash values calculated for the first operation and the second operation would include FN(1, A).

Additional operation examples are given in FIGS. 5A-E. Additionally, the calculation of hash values to detect dependencies is described in further detail in U.S. patent application Ser. No. 13/951,281, entitled "Client and Server Integration for Replicating Data," filed Jul. 25, 2013, which is hereby incorporated by reference in its entirety for all purposes as if fully set forth herein.

Generating Inter-Transaction Dependencies

A non-limiting example of generating inter-transaction dependencies is provided. FIGS. 4A-D illustrate an embodiment of processing change records for pending transactions. FIG. 4A illustrates a set of transactions A-D. Transactions A-D each include a set of change records. When each change record is read, an operation is performed on the change record to determine a database operation type corresponding to the change record. For example, a hash function may be applied to the change record. In FIG. 4A, an example hash value is displayed for each change record of each transaction.

As the change records of each transaction are read, the hash values are calculated, and a transaction identifier of the transaction is stored in a hash table 410 based on the hash value. FIG. 4B illustrates a hash table 410 after processing transaction A. When the hash function is applied to each change record of transaction A, the hash value of each change record is [3] or [5]. After processing the change records of transaction A, hash table 410 includes an identifier for transaction A for hash values [3] and [5]. If there is a hash table collision in the hash table 410, then the change records are associated with the same value in at least one column, and the transaction corresponding to the current change record is potentially dependent on the one or more transactions already in the hash table for the specific hash value.

FIG. 4C illustrates hash table 420 after processing all the transactions shown in FIG. 4A. Because the hash value for one or more change records of transaction D is [1], and because the hash value for one or more change records of transaction B is [1], and because transaction B is before transaction D, transaction D is dependent on transaction B. Likewise, because one or more hash values associated with transaction D is the same as one or more hash values associated with transaction A, [3] and [5], and because transaction A is before transaction D, transaction D is dependent on transaction A.

FIG. 4D illustrates a dependency graph for transactions A-D. Dependency graph 430 includes inter-transaction dependency relationships showing that transaction D is dependent on transactions A and B. In one embodiment, dependency graph 430 also includes similarity data for each pair of transactions A-D, where transactions A-D are pending transactions.

Generating a Batch Transaction

A batch transaction is generated by adding one or more pending transactions based on the inter-transaction dependency data, such as the dependency graph information. Optionally, the similarity data may also be used to select pending transactions.

In one embodiment, batch transactions are generated such that one or more batch transactions can be executed without waiting for transactions external to the batch transaction. This reduces cross-process communications. In another embodiment, one or more batch transactions do not strictly adhere to omitting external dependencies, such as when cross-process communication is less costly. The rules and parameters for building batch transactions are flexible. In one embodiment, the rules and parameters for building batch transactions may be preset, manually modified, automatically determined, and/or dynamically determined.

In one embodiment, a batch transaction is generated by first selecting an initial set of one or more transactions to add. Additional transactions may be added based on dependency relationships and/or other factors, such as similarity. In one embodiment, when determining the initial set of one or more transactions, no transaction that is dependent on a currently executing transaction is considered as a candidate transaction. In one embodiment, additional transactions are added by evaluating candidate transactions that depend on transactions currently in the batch transaction. A candidate transaction with no dependency relationship may also be selected.

In one embodiment, pending transactions are added to the batch transaction iteratively; after a first transaction or set of transactions added, other candidate transactions are evaluated with respect to their relationship to the transactions already added. The iterative selection of pending transactions may be based on one or more greedy functions that scores candidate transactions and add the next best transaction and/or group of transactions. Alternatively and/or in addition, the pending transactions are evaluated together and an optimal set of pending transactions is selected.

In one embodiment, pending transactions are selected to add to the batch transaction based on edges of the dependency graph. For example, a batch transaction can be built by choosing the independent pending transaction with the longest chain of records depending on it. The dependency graph may be traversed by finding ancestors until a transaction is reached that is dependent on multiple transactions. If a parent transaction dependent on multiple transactions is reached, but the subtree of other transactions on which the parent transaction is dependent may be added to the transaction, then the entire subtree may be evaluated as candidate transactions. In one embodiment, if the subtree does not contain any transaction that is dependent on a currently executing transaction, the transactions in the subtree are evaluated as candidate transactions to add as a group, or to omit as a group.

There are many ways to evaluate candidate transactions to add to a specific batch transaction. Some of the considerations include, but are not limited to:

transaction similarity;
graph depth;
subtree size;
transaction size;
batch size; and
transaction age.

A transaction score may be calculated for one or more pending transactions. The transaction score may be used to determine which pending transactions should be added to a batch transaction. For example, a transaction score may be calculated based on dependency edges (or any other inter-transaction dependency relationships) and/or similarity edges (or any other similarity data). When a new pending transaction is added to the dependency graph, one or more transactions scores may be recalculated and/or modified based on new pending transaction data. Likewise, after a pending transaction is assigned to a batch transaction, one or more transaction scores may be recalculated and/or modified when the pending transaction is removed from the dependency graph.

In one embodiment, a transaction score is not calculated for pending transactions that depend on one or more currently executing transactions. The transaction score may be calculated for such pending transactions when the one or more currently executing transactions are complete.

Reordering a Batch Transaction

A batch transaction includes database operations from one or more transactions. The database operations of a batch transaction may be reordered to optimize applying of the database operations to the target database. For example, reordering may be performed to maximize the use of array operations when executing the reordered transaction. Array operations improve database performance by combining operations of the same operation type.

When reordering the operations within a batch transaction, intra-batch dependencies must be taken into account. For example, a first operation in a batch transaction may depend on a second operation within the batch transaction. To satisfy the intra-batch dependency, the second operation must be performed before the first operation.

In reordering, an ordered grouping of the change records is determined based on operation types and intra-batch dependencies. Change records sharing operation types are grouped together unless a division based on an intra-batch dependency is determined. The groups of change records may be executed using array operations.

Because two operations are the same operation type when they operate on the same column, column data may be hashed. In one embodiment, columns are assigned identifiers which are used to generate dependency data. In one embodiment, primary key columns are assigned constraint identifiers that are hashed.

FIGS. 5A-E illustrate embodiments a batch transaction in intermediate stages of reordering. Although structures relating to relational databases are shown, the reordering steps may be applied to any database. FIG. 5A illustrates an embodiment of tables in a relational database. TABLE_X 502 and TABLE_Y 508 are tables in a relational database. TABLE_X 502 includes two columns: X_PRIMARY 504 and column "VALUE" 506. X_PRIMARY 504 is a primary key column for TABLE_X 502. A value in X_PRIMARY 504 uniquely identifies a row of TABLE_X 502.

TABLE_Y 508 includes two columns: Y_PRIMARY 510 and X_FOREIGN 512. Y_PRIMARY 510 is a primary key column for TABLE_Y 508. A value in Y_PRIMARY 510 uniquely identifies a row of TABLE_Y 508. X_FOREIGN 512 is a foreign key column. A value in X_FOREIGN 512 identifies a row of TABLE_X 502 by the primary key value in X_PRIMARY 504 of TABLE_X 502.

Constraint identifiers 514-518 are assigned to a plurality of columns in the relational database. In one embodiment, constraint identifiers 514-518 are assigned to columns with constraints that can affect inter-transaction and intra-transaction dependencies, such as columns containing primary keys, foreign keys, and unique indexes. Constraint identifiers 514-518 may also include one or more user-expressed constraints and/or application constraints. Constraint identifiers 514-518 may be generated based on a schema of a database or other metadata associated with the database.

In one embodiment, constraint identifiers are assigned the same value to reflect a dependency. For example, constraint identifier 518 of column X_FOREIGN 512 is assigned the same value, "A", as constraint identifier 514 of column X_PRIMARY 504.

Dependency data is generated for one or more change records corresponding to an operation, such as an operation that inserts (adds), deletes, or updates (or otherwise modifies) a row (or data). The change record contains old values for columns for a delete, new values for an insert, and both old values and new values for updates (or the case where existing data is modified). For updates, the change record may contain an old value, but not a new value for a column, if that column has not been modified. The dependency data is generated based on the column values in the change record for the columns in the constraint. For updates, the dependency data can be generated for both the old and new values (if no old value is available in the change record for a constraint column, then the old value for the column can be used). In one embodiment, the dependency data for each change record includes at least one hash value. Each hash value is generated by hashing a column value, such as the values described above, with a constraint identifier 514-418 associated with the column.

FIG. 5B illustrates an embodiment of a batch 520 of one or more transactions. Batch 520 includes operations R1-R12. Operations R1-R12 may come from a single transaction or multiple transactions grouped into batch 520. During the reordering process, operations R1-R12 may be stored as change records in the format received by the database server and/or any other format that stores the equivalent information for operations R1-R12. The change records and/or operations may be converted from one format to another to facilitate database server operations. To the extent that the terms operation and change record refers to the same underlying data, the terms may be used interchangeably.

FIG. 5C illustrates an embodiment of dependency data generated based on at least one value change and at least one constraint identifier associated with one or more columns in each of operations R1-R12. Dependency data 520 is generated for an operation based on at least one column value in at least one column associated with a constraint identifier. In one embodiment, dependency data 520 is generated for operations R1-R12 by applying a function FN to a value change in a column and a constraint identifier associated with the column. In one embodiment, function FN is a hash function, and the dependency data includes hash values associated with one or more operations.

For example, operation R5 inserts a row (2, 1) into TABLE_Y, where the value 2 is inserted into column Y_PRIMARY 510 and the value 1 is inserted into column X_FOREIGN. The corresponding dependency data 520 for operation R5 includes a first dependency value FN(2,B) and a second dependency value FN(1,A). For the first dependency value, function FN is applied to the value "2" inserted into column Y_PRIMARY 510, and the constraint identifier value "B" associated with column Y_PRIMARY 510. For the second dependency value, function FN is applied to the value "1" inserted into column X_FOREIGN 512, and the constraint identifier value "A" associated with column X_FOREIGN 512.

In one embodiment, dependency data 520 is previously generated by the database server while computing inter-transaction dependencies. The previously generated dependency data 520 is preserved for use to compute intra-transaction dependencies for reordering a batch of one or more transactions as well as inter-batch transactions. For example, data generated by the apply reader to compute inter-transaction dependencies may be preserved for use by apply processes 208-210. For example, after scheduling process 204 and/or scheduling process 204 computes and/or uses inter-transaction dependencies to determine at least one batch, and apply processes 208-210 may use the data to compute intra-transaction dependencies to reorder change records within a batch of one or more transactions.

FIG. 5D illustrates an embodiment of an ordered grouping of operations. Operations R1-R12 are grouped into a plurality of ordered groups 524. Operations R1-R12 are grouped based on an operation type of each change record. For example, operations may be grouped by matching at least a portion of a change record, wherein a portion of the change record indicates operation type.

In one embodiment, operation types include the column set affected by the operation. For example, GROUP 3 includes UPDATE operations performed on a column set containing X_VALUE 506, while GROUP 5 includes UPDATE operations performed on a column set containing X_PRIMARY 504. A specific operation type used for grouping may involve the same operation on the same column set of the same table.

In one embodiment, operations sharing an operation type are grouped together unless a division based on the dependency data is determined. In one embodiment, a division based on dependency data is determined when one or more operations sharing an operation type also share dependency data values. In one embodiment, a division is determined when at least one hash value is shared by operations within a group. A shared dependency data value may indicate a potential dependency.

For example, operations R1, R2, R4, R6, R9 and R10 share the same operation type INSERT into TABLE_X 502. Because a division based on dependency data 522 is determined, these operations are separated into two groups: GROUP 1 and GROUP 5. For example, as shown in dependency data 522, operations R4 and R9 share the dependency data value FN(3,A).

The order of ordered grouping 524 may be based at least in part on an original operation order in the batch of one or more transactions. In one embodiment, the dependency data may further be used to determine an order of the groups. For example, as shown in dependency data 522, operation R8 shares dependency data value FN(3,A) with operation R9, indicating a dependency. To address this dependency, operation R9 is placed in GROUP 5, a group that occurs after GROUP 4, which contains R8.

A shared dependency data value may indicate a potential dependency. Additional processing may determine whether the potential dependency is associated with an intra-transaction dependency that must be satisfied to execute the batch one or more transactions. In one embodiment, additional logic is used to determine whether a division is appropriate when a dependency data value is shared. One or more rules for division based on dependency values may be implemented to detect and handle intra-transaction dependencies.

As a non-limiting example, operations R3, R5 and R11 of batch 520 shared dependency data value $FN(1,A)^{FK}$, wherein "$^{FK}$" indicates that the dependency value is generated based on a foreign key constraint associated with a primary key column X_PRIMARY 504 of TABLE_X 502. By tracking the source of the dependency value with the information "$^{FK}$", it is determined that operations R3, R5 and R11 may be placed in the same group without violating any intra-transaction dependency because INSERT operations into TABLE_Y 508 do not depend on each other.

FIG. 5E illustrates an embodiment of a reordered batch of operations. Reordered batch 526 includes a plurality of reordered operations from batch 520. The operations are ordered based on the ordered grouping 524. In one embodiment, grouping is configured to maximize the number of operations and/or change records in a group. When reordered batch 526 is executed by the database server, the database server may use array operations on consecutive operations within reordered batch 526. Although FIG. 5E illustrates a separate reordered batch 526 from the ordered grouping 524, the order grouping 524 may be considered a reordered transaction when executed by the database server, even if a separate transaction structure is not generated.

Replication Procedure

Figure 6:
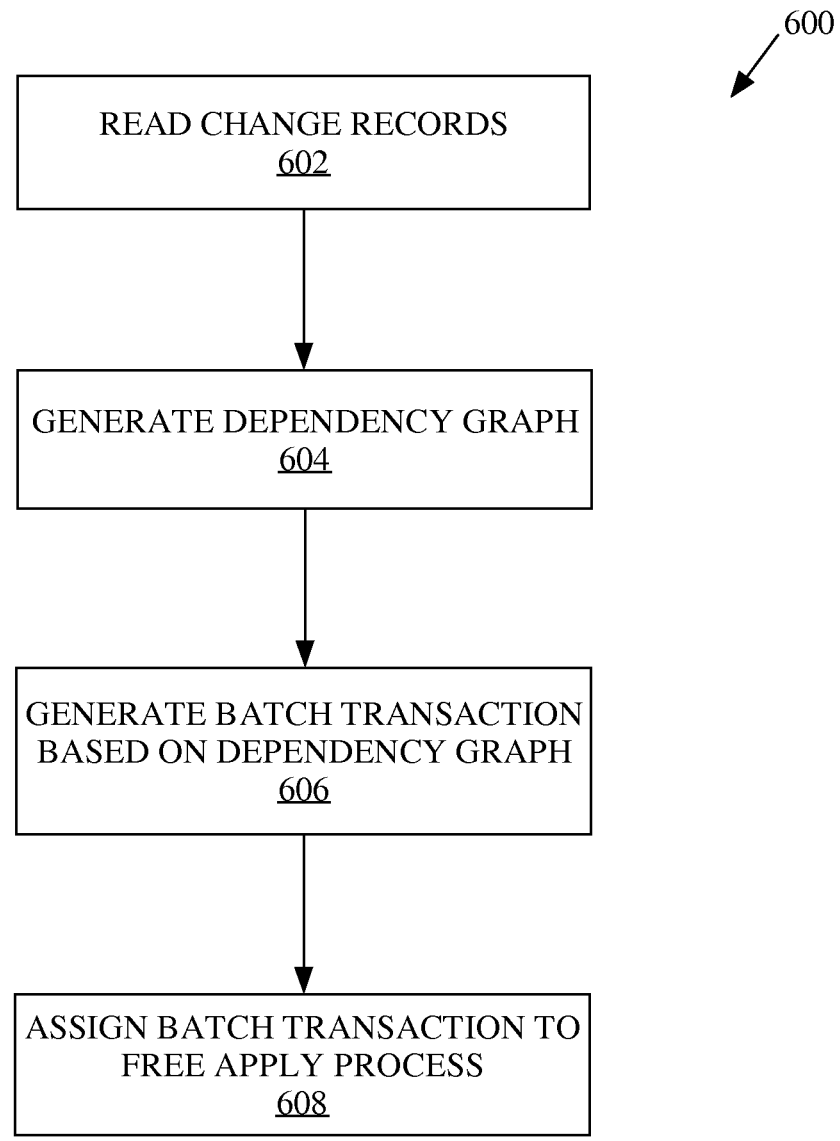
FIG. 6 is a flowchart illustrating an embodiment of a procedure for replication.

FIG. 6 is a flowchart illustrating an embodiment of a procedure for replication. Process 600 may be performed by one or more computing devices. For example, one or more steps of the procedure may be performed by computer system 900. In one embodiment, the procedure is performed by a replication system, such replication client 200.

In block 602, a plurality of change records are read. The plurality of change records correspond to plurality of transactions. In one embodiment, the plurality of change records is read from a replication data source comprising change records corresponding to transactions applied to a target database server. The replication data source may be a file, a network location, a data stream, or any other source from which replication data may be read.

In block 604, inter-transaction dependency data is generated. In one embodiment, the inter-transaction dependency data is a dependency graph. The inter-transaction dependency data includes at least one inter-transaction dependency relationship between a plurality of pending transactions. Each inter-transaction dependency relationship indicates that a first transaction is dependent on a second transaction.

In block 606, a batch transaction is generated based on the inter-transaction dependency data. The batch transaction includes at least one pending transaction of the plurality of pending transactions.

In block 608, the batch transaction is assigned to an apply process. The apply process is one of the plurality of apply processes configured to apply batch transactions in parallel. In one embodiment, the batch transaction is generated and assigned to a free apply process in response to a notification from the free apply process regarding its status. In one embodiment, after the batch transaction is assigned to the free apply process, the inter-transaction dependency data is updated to indicate that the transactions in the batch transaction are currently executing, and/or no longer pending.

Processing Change Records

Figure 7:
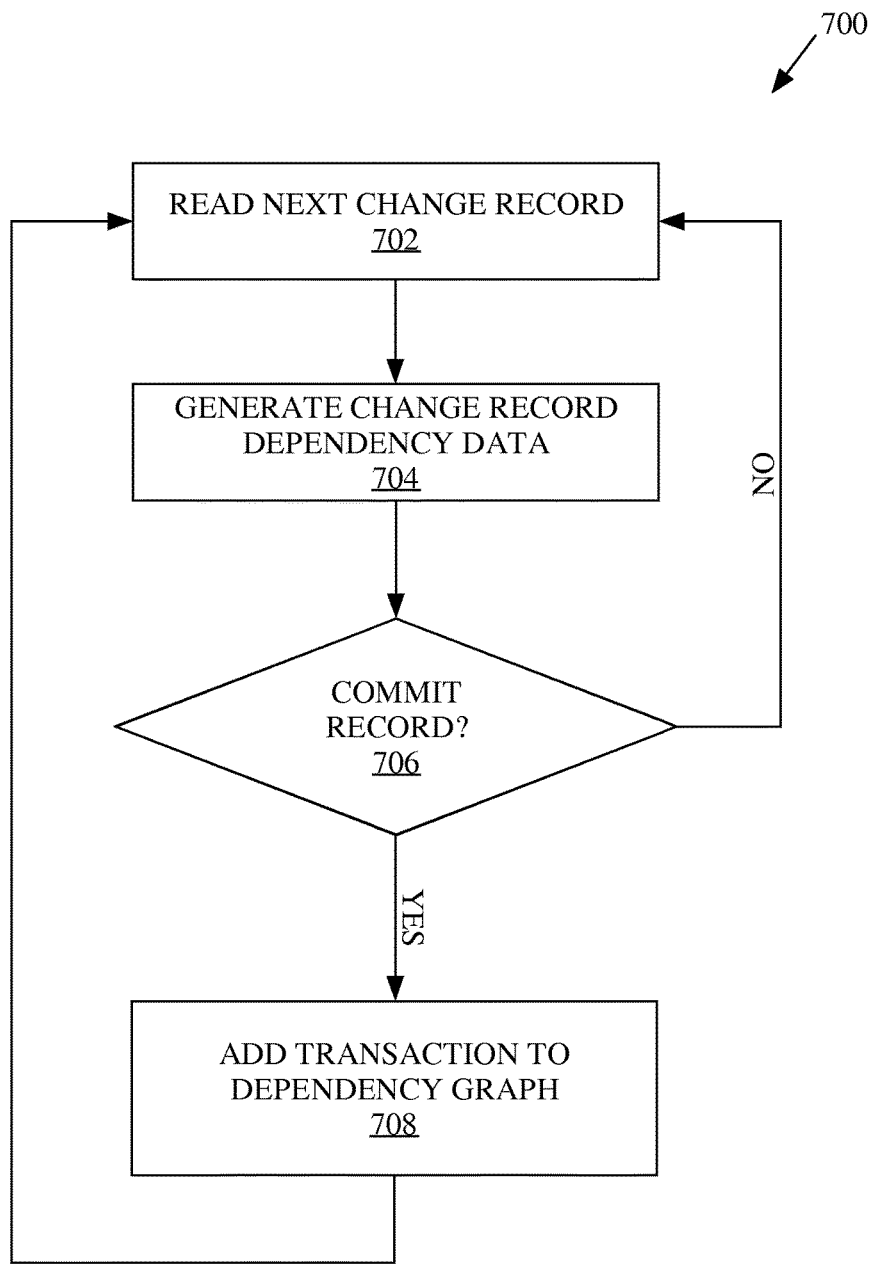
FIG. 7 is a flowchart illustrating an embodiment of a procedure for processing change records.

FIG. 7 is a flowchart illustrating an embodiment of a procedure for processing change records. Process 700 may be performed by one or more computing devices. For example, one or more steps of the procedure may be performed by computer system 900. In one embodiment, the procedure is performed by a scheduling process of a replication system, such as scheduling process 204 of replication client 200.

In block 702, the next change record is read from the plurality of change records. In one embodiment, the next change record is read from a replication data source comprising transactions applied to a target database server.

In block 704, change record dependency data is generated for the current change record. In one embodiment, change record dependency data is generated by applying a hash function to the current change record, such as by the procedure illustrated in FIGS. 4A-4D.

In decision block 706, it is determined if the change record is a commit record of the transaction. If it is determined that the change record is not a commit record, processing returns to block 702. Otherwise, if it is determined that the change record is a commit record, processing continues to block 708.

In block 708, the transaction corresponding to the last commit record is added to the inter-transaction dependency data. For example, when the transaction is dependent on one or more other pending transactions, one or more inter-transaction dependency relationships are added indicating those dependencies. When the inter-transaction dependency data is a dependency graph, the transaction is added to the dependency graph by adding a node corresponding to the transaction. If the transaction is dependent on any other pending transactions, one or more directed dependency edges from the transaction to the other pending transactions are added. In one embodiment, similarity data is also generated between the newly committed transaction and the other pending transactions.

Assigning Transactions

Figure 8:
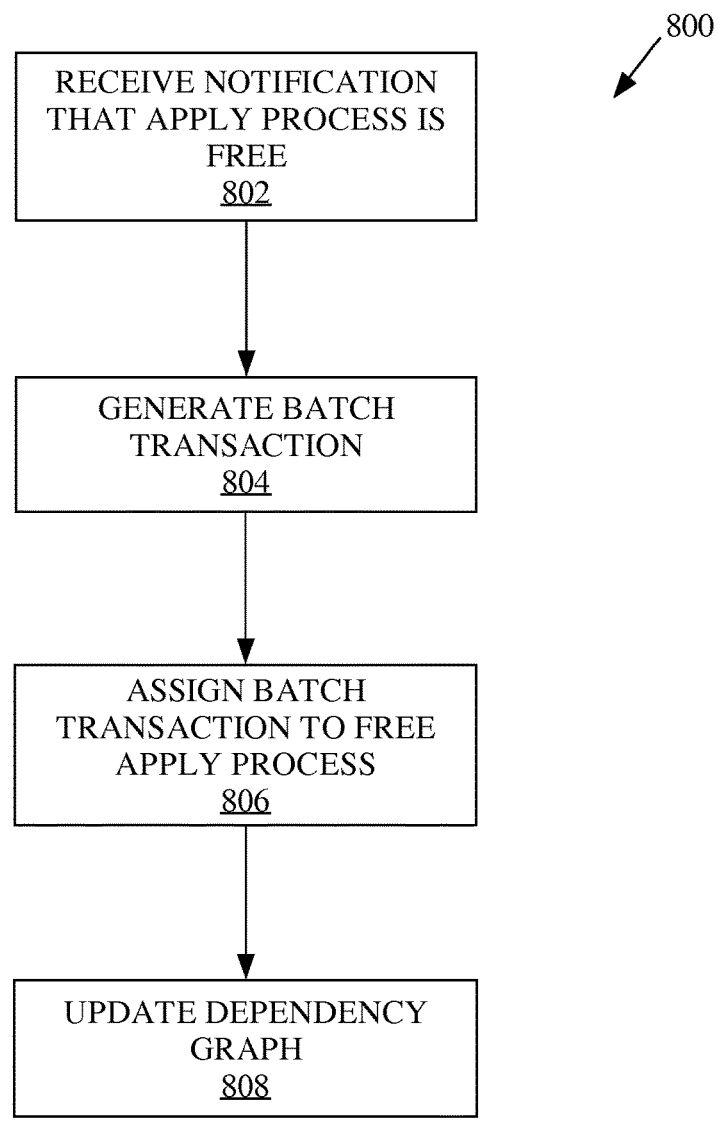
FIG. 8 is a flowchart illustrating an embodiment of a procedure for assigning batch transactions.

FIG. 8 is a flowchart illustrating an embodiment of a procedure for assigning batch transactions. Process 800 may be performed by one or more computing devices. For example, one or more steps of the procedure may be performed by computer system 900. In one embodiment, the procedure is performed by a scheduling process of a replication system, such as scheduling process 204 of replication client 200.

In block 802, a notification is received that an apply process is free. The free apply process is one of the plurality of apply processes configured to apply batch transactions in parallel. In one embodiment, the notification also serves as an indication that the free apply process has finished executing a prior batch transaction assigned to it. In response to such a notification, the inter-transaction dependency data (e.g. dependency graph) is updated to indicate that transactions of the prior batch transaction are complete. Alternatively, a separate notification may be received corresponding to completing a prior batch transaction, and the dependency graph may be updated based on the separate notification.

In block 804, a batch transaction is generated in response to receiving the notification that the apply process is free. The notification indicates that the apply process is ready for and/or requesting a new batch transaction to process. Alternatively, one or more batch transactions may be generated prior to receiving any notification from any free apply process.

In block 806, a batch transaction is assigned to the free apply process.

In block 808, the inter-transaction dependency data (e.g. dependency graph) is updated to indicate that the transactions in the batch transaction are currently executing, and/or no longer pending.

Replication System Configurations

The techniques for dependency-aware transaction batching described herein are suitable for deployment in both client-side and server-side replication. Client-side replication refers to a traditional replication client. Server-side replication refers to replication where one or more elements of the replication client, including but not limited to the elements shown in replication client 200, is integrated with the target database server. For example, server-side replication may involve a replication client integrated with the target database server to bypass a the public interface, such as a SQL command interface, for one or more operations.

For client-side replication, by batching transactions such that each transaction is not dependent on any non-committed transaction, the need to synchronize apply processes to account for inter-transaction dependencies is eliminated. Furthermore, for replication clients that interact with a target database server over a synchronous connection, the round-trip time is reduced by the efficiencies gained by dependency-aware transaction batching.

In one embodiment, at least a portion of the steps of the techniques for dependency-aware transaction batching may be performed server-side. One example of server-side replication is described in U.S. patent application Ser. No. 13/951,281, entitled "Client and Server Integration for Replicating Data," filed Jul. 25, 2013, which is hereby incorporated by reference in its entirety for all purposes as if fully set forth herein.

Dependency-aware transaction batching has the potential to provide a much higher level of concurrency then prior solutions. Reduced synchronization communication also makes the solution deployable on shared-disk database systems, such as Oracle Real Application Clusters (RAC). A shared-disk database includes multiple database instances configured to access a single database.

In one embodiment, different apply processes are associated with different database instances of a shared-disk database. When the dependency-aware transaction batching techniques are deployed on a shared-disk database, scalability is increased, allowing for high throughput replication. The techniques provided herein, as applied to multiple instance database configurations, are not limited to Oracle RAC, and may apply to any proprietary and/or standardized shared-disk database architecture.

The solution is also deployable on consolidated database systems, such as a container database management system. In a container database management system, a container database manages multiple pluggable databases. Each pluggable database may be open or closed in the container database independently from other pluggable databases. A container database management system may be implemented as a shared-disk database.

Database Overview

Embodiments described herein may be used in the context of database management systems (DBMSs). A DBMS manages a database. A DBMS may comprise one or more database servers. A database comprises database data and a database dictionary that are stored on a persistent memory mechanism, such as a set of hard disks. Database data may be stored in one or more data containers, each containing one or more records. The data within each record is organized into one or more fields. In relational DBMSs, the data containers are referred to as tables, the records are referred to as rows, and the fields are referred to as columns. In object-oriented databases, the data containers are referred to as object classes, the records are referred to as objects, also referred to herein as object records, and the fields are referred to as attributes. Other database architectures may use other terminology.

Database users interact with a database server of a DBMS by submitting to the database server commands that cause the database server to perform operations on data stored in a database. A user may be one or more applications running on a client that interact with a database server. A database command may be in the form of a database statement that conforms to a syntax of a database language. One example language for expressing database commands is the Structured Query Language (SQL). SQL data definition language ("DDL") instructions are issued to a DBMS to define database structures such as tables, views, or complex data types. SQL data manipulation language ("DML") instructions are issued to a DBMS to manage data stored within a database structure.

Although the examples described above are based on Oracle's SQL, the techniques provided herein are not limited to Oracle's SQL, to any proprietary form of SQL, to any standardized version or form of SQL (ANSI standard), or to any particular form of database command or database language. Furthermore, for the purpose of simplifying the explanations contained herein, database commands or other forms of computer instructions may be described as performing an action, such as creating tables, modifying data, and setting session parameters. However, it should be understood that the database command itself performs no actions, but rather the DBMS, upon executing the database command, performs the corresponding actions.

Hardware Overview

Figure 9:
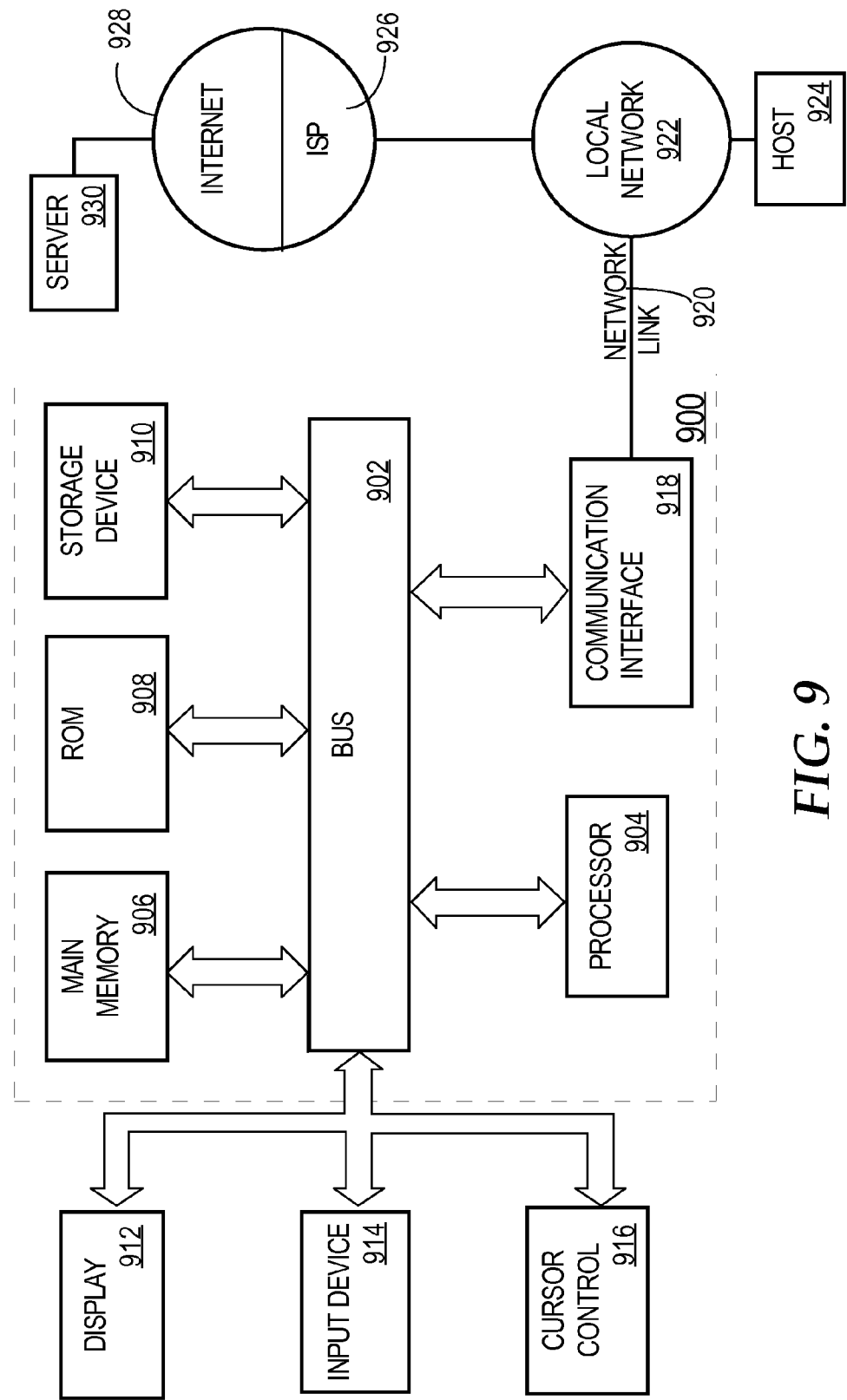
FIG. 9 illustrates a computer system upon which one or more embodiments may be implemented.

FIG. 9 is a block diagram that illustrates a computer system 900 upon which an embodiment of the invention may be implemented. Computer system 900 includes a bus 902 or other communication mechanism for communicating information, and a processor 904 coupled with bus 902 for processing information. Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Computer system 900 further includes a read only memory (ROM) 908 or other static storage device coupled to bus 902 for storing static information and instructions for processor 904. A storage device 910, such as a magnetic disk or optical disk, is provided and coupled to bus 902 for storing information and instructions.

Computer system 900 may be coupled via bus 902 to a display 912, such as a cathode ray tube (CRT), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

The invention is related to the use of computer system 900 for implementing the techniques described herein. According to one embodiment of the invention, those techniques are performed by computer system 900 in response to processor 904 executing one or more sequences of one or more instructions contained in main memory 906. Such instructions may be read into main memory 906 from another machine-readable medium, such as storage device 910. Execution of the sequences of instructions contained in main memory 906 causes processor 904 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 900, various machine-readable media are involved, for example, in providing instructions to processor 904 for execution. Such a medium may take many forms, including but not limited to storage media and transmission media. Storage media includes both non-volatile media and volatile media. Non-volatile media includes, for example, optical or magnetic disks, such as storage device 910. Volatile media includes dynamic memory, such as main memory 906. Transmission media includes coaxial cables, copper wire and fiber optics, including the wires that comprise bus 902. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 904 for execution. For example, the instructions may initially be carried on a magnetic disk of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are exemplary forms of carrier waves transporting the information.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution. In this manner, computer system 900 may obtain application code in the form of a carrier wave.

Extensions And Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
   reading a plurality of change records corresponding to a plurality of transactions that were executed at a source database but have not been executed at a target database;
   generating inter-transaction dependency data comprising at least one inter-transaction dependency relationship between transactions in the plurality of transactions;
   generating a batch transaction comprising a first transaction of the plurality of transactions;
   based on the inter-transaction dependency data, detecting that a second transaction of the plurality of transactions is dependent on the first transaction;
   based on detecting that the second transaction is dependent on the first transaction, adding the second transaction to the batch transaction;
   based on the inter-transaction dependency data, reordering, after said adding, operations that are contained in the batch transaction;
   assigning the batch transaction to an apply process for execution at the target database;
   wherein the method is performed by one or more computing devices.

2. The method of claim 1, further comprising:
   receiving a notification from the apply process that the apply process is free;
   wherein the batch transaction is generated in response to receiving the notification.

3. The method of claim 1, wherein reading the plurality of change records and generating the inter-transaction dependency data comprises:
   reading one or more specific change records of a specific transaction;
   generating change record dependency data based on the one or more specific change records;
   based on the change record dependency data, determining a transaction that the specific transaction is dependent on;
   adding, to the inter-transaction dependency data, an inter-transaction dependency relationship between the specific transaction and the transaction that the specific transaction is dependent on.

4. The method of claim 1,
   wherein the first transaction is an independent transaction;
   wherein determining whether to add the second transaction comprises:
   determining whether any transaction on which the second transaction is directly or indirectly dependent is currently executing; and
   when it is determined that no transaction on which the second transaction is directly or indirectly dependent is currently executing, adding the second transaction and the transactions on which the second transaction is directly or indirectly dependent to the batch transaction.

5. The method of claim 1, wherein the inter-transaction dependency data further indicates whether one or more transactions are currently executing.

6. The method of claim 5, wherein generating the inter-transaction dependency data further comprises updating the inter-transaction dependency data after assigning the batch transaction to indicate that the first transaction and the second transaction are currently executing.

7. The method of claim 1, further comprising:
receiving a notification from the apply process that the apply process has finished executing the batch transaction;
after receiving the notification, updating the inter-transaction dependency data to indicate that at least one transaction of the batch transaction was committed on the target database.

8. A method comprising:
reading a plurality of change records corresponding to a plurality of transactions;
generating inter-transaction dependency data comprising at least one inter-transaction dependency relationship between a plurality of pending transactions, each inter-transaction dependency relationship indicating that a first transaction is dependent on a second transaction;
generating a batch transaction based on the inter-transaction dependency data, the batch transaction comprising at least one pending transaction of the plurality of pending transactions;
assigning the batch transaction to an apply process of a plurality of apply processes configured to apply batch transactions in parallel;
wherein determining whether to add the second transaction to the batch transaction comprises:
determining a first cost estimate of executing, as separate transactions, the first transaction and the second transaction;
determining a second cost estimate of executing, in the same batch transaction, the first transaction and the second transaction;
wherein determining whether to add the second transaction to the batch transaction is based at least in part on the first cost estimate and the second cost estimate;
wherein the method is performed by one or more computing devices.

9. The method of claim 1, wherein determining whether to add the second transaction to the batch transaction is based on a similarity score that is based on:
operation types common to both the first transaction and the second transaction, and
counts of operations of each operation type in the first transaction and the second transaction.

10. A method comprising:
reading a plurality of change records corresponding to a plurality of transactions that were executed at a source database but have not been executed at a target database;
generating inter-transaction dependency data comprising at least one inter-transaction dependency relationship between transactions in the plurality of transactions;
generating a batch transaction comprising a first transaction of the plurality of transactions;
based on the inter-transaction dependency data, detecting that a second transaction of the plurality of transactions is dependent on the first transaction;
based on detecting that the second transaction is dependent on the first transaction, adding the second transaction to the batch transaction;
assigning the batch transaction to an apply process for execution at the target database; wherein:
generating the inter-transaction dependency data comprises generating at least one similarity score for at least one pair of transactions based on one or more operations belonging to each pair of the at least one pair of transactions;
each operation of the one or more operations belonging to said each pair of transactions of the at least one pair of transactions operates on a same column of a database table for both transactions of said each pair of transactions;
selecting the second transaction is based at least in part on at least one similarity score between the first transaction and one or more transactions dependent on the first transaction;
wherein the method is performed by one or more computing devices.

11. One or more non-transitory computer-readable media storing instructions that, when executed by one or more processors, cause:
reading a plurality of change records corresponding to a plurality of transactions that were executed at a source database but have not been executed at a target database;
generating inter-transaction dependency data comprising at least one inter-transaction dependency relationship between transactions in the plurality of transactions;
generating a batch transaction comprising a first transaction of the plurality of transactions;
based on the inter-transaction dependency data, detecting that a second transaction of the plurality of transactions is dependent on the first transaction;
based on detecting that the second transaction is dependent on the first transaction, adding the second transaction to the batch transaction;
based on the inter-transaction dependency data, reordering, after said adding, operations that are contained in the batch transaction;
assigning the batch transaction to an apply process for execution at the target database.

12. The one or more non-transitory computer-readable medium of claim 11, wherein the instructions further cause receiving a notification from the apply process that the apply process is free;
wherein the batch transaction is generated in response to receiving the notification.

13. The one or more non-transitory computer-readable medium of claim 11, wherein reading the plurality of change records and generating the inter-transaction dependency data comprises:
reading one or more specific change records of a specific transaction;
generating change record dependency data based on the one or more specific change records;
based on the change record dependency data, determining a transaction that the specific transaction is dependent on;
adding, to the inter-transaction dependency data, an inter-transaction dependency relationship between the specific transaction and the transaction that the specific transaction is dependent on.

14. The one or more non-transitory computer-readable medium of claim 11,
wherein the first transaction is an independent transaction;
wherein determining whether to add the second transaction comprises:
determining, whether any transaction on which the second transaction is directly or indirectly dependent, is currently executing; and when it is determined that no transaction on which the second transaction is directly or indirectly dependent is currently executing, adding the second transaction and the transactions on which the second transaction is directly or indirectly dependent to the batch transaction.

15. The one or more non-transitory computer-readable medium of claim 11, wherein the inter-transaction dependency data further indicates whether one or more transactions are currently executing.

16. The one or more non-transitory computer-readable medium of claim 15, wherein generating the inter-transaction dependency data further comprises updating the inter-transaction dependency data after assigning the batch transaction to indicate that the first transaction and the second transaction are currently executing.

17. The one or more non-transitory computer-readable medium of claim 11, wherein the instructions further cause:
   receiving a notification from the apply process that the apply process has finished executing the batch transaction;
   after receiving the notification, updating the inter-transaction dependency data to indicate that at least one transaction of the batch transaction was committed on the target database.

18. One or more non-transitory computer-readable medium storing instructions that, when executed by one or more processors, cause:
   reading a plurality of change records corresponding to a plurality of transactions;
   generating inter-transaction dependency data comprising at least one inter-transaction dependency relationship between a plurality of pending transactions, each inter-transaction dependency relationship indicating that a first transaction is dependent on a second transaction;
   generating a batch transaction based on the inter-transaction dependency data, the batch transaction comprising at least one pending transaction of the plurality of pending transactions;
   assigning the batch transaction to an apply process of a plurality of apply processes configured to apply batch transactions in parallel;
   wherein determining whether to add the second transaction to the batch transaction comprises:
      determining a first cost estimate of executing, as separate transactions, the first transaction and the second transaction;
      determining a second cost estimate of executing, in the same batch transaction, the first transaction and the second transaction;
   wherein determining whether to add the second transaction to the batch transaction is based at least in part on the first cost estimate and the second cost estimate.

19. The one or more non-transitory computer-readable medium of claim 18, wherein determining whether to add the second transaction to the batch transaction is based on a similarity score that is based on:
   operation types common to both the first transaction and the second transaction, and
   counts of operations of each operation type in the first transaction and the second transaction.

20. One or more non-transitory computer-readable medium storing instructions that, when executed by one or more processors, cause:
   reading a plurality of change records corresponding to a plurality of transactions that were executed at a source database but have not been executed at a target database;
   generating inter-transaction dependency data comprising at least one inter-transaction dependency relationship between transactions in the plurality of transactions;
   generating a batch transaction comprising a first transaction of the plurality of transactions;
   based on the inter-transaction dependency data, detecting that a second transaction of the plurality of transactions is dependent on the first transaction;
   based on detecting that the second transaction is dependent on the first transaction, adding the second transaction to the batch transaction;
   assigning the batch transaction to an apply process for execution at the target database; wherein:
      generating the inter-transaction dependency data comprises generating at least one similarity score for at least one pair of transactions based on one or more operations belonging to each pair of the at least one pair of transactions;
      each operation of the one or more operations belonging to said each pair of transactions of the at least one pair of transactions operates on a same column of a database table for both transactions of said each pair of transactions;
      selecting the second transaction is based at least in part on at least one similarity score between the first transaction and one or more transactions dependent on the first transaction.

21. The method of claim 1 wherein:
the first transaction comprises a plurality of operations;
the second transaction comprises a plurality of operations;
the method further comprises, after applying an operation of the first transaction and applying an operation of the second transaction, applying a commit record of the first transaction and applying a commit record of the second transaction.

22. The method of claim 1 wherein:
the first transaction comprises a plurality of operations;
the second transaction comprises a plurality of operations;
the method further comprises, based on types of operations of the first transaction and types of operations of the second transaction, reordering operations of the first transaction and operations of the second transaction within the batch transaction.

* * * * *

UNITED STATES PATENT AND TRADEMARK OFFICE
CERTIFICATE OF CORRECTION

PATENT NO. : 10,191,932 B2
APPLICATION NO. : 14/222373
DATED : January 29, 2019
INVENTOR(S) : Lehouillier et al.

Page 1 of 2

It is certified that error appears in the above-identified patent and that said Letters Patent is hereby corrected as shown below:

In the Specification

In Column 16, Line 41, delete "a the" and insert -- the --, therefor.

In the Claims

In Column 21, Line 28, in Claim 8, before "determining" delete "wherein".

In Column 21, Lines 28-29, in Claim 8, after "second transaction" insert -- of an inter-transaction dependency relationship of the inter-transaction dependency data --.

In Column 21, Line 29, in Claim 8, delete "transaction comprises:" and insert -- transaction, including: --, therefor.

In Column 21, Line 32, in Claim 8, after "transaction;" insert -- and --.

In Column 22, Line 3, in Claim 10, delete "transactions;" and insert -- transactions, and --, therefor.

In Column 22, Line 9, in Claim 10, after "transaction" delete "is".

In Column 22, Line 40, in Claim 12, delete "medium" and insert -- media --, therefor.

In Column 22, Line 46, in Claim 13, delete "medium" and insert -- media --, therefor.

In Column 22, Line 61, in Claim 14, delete "medium" and insert -- media --, therefor.

In Column 23, Line 8, in Claim 15, delete "medium" and insert -- media --, therefor.

In Column 23, Line 12, in Claim 16, delete "medium" and insert -- media --, therefor.

Signed and Sealed this
Fourth Day of February, 2020

Andrei Iancu
*Director of the United States Patent and Trademark Office*

CERTIFICATE OF CORRECTION (continued)
U.S. Pat. No. 10,191,932 B2

In Column 23, Line 19, in Claim 17, delete "medium" and insert -- media --, therefor.

In Column 23, Line 29, in Claim 18, delete "medium" and insert -- media --, therefor.

In Column 23, Line 57, in Claim 19, delete "medium" and insert -- media --, therefor.

In Column 24, Line 8, in Claim 20, delete "medium" and insert -- media --, therefor.